Patented Dec. 3, 1946

2,412,034

UNITED STATES PATENT OFFICE 2,412,034

SYNTHETIC COMPOSITIONS AND PRODUCTS HAVING MOLECULARLY ORIENTED STRUCTURE

Gaetano F. D'Alelio, Pittsfield, Mass., assignor to General Electric Company, a corporation of New York No Drawing. Application June 4, 1942,
Serial No. 445,808

2 Claims. (Cl. 28—82)

This invention relates to novel synthetic compositions wherein the molecules have been oriented so that they are parallel with the major surface. More particularly this invention relates to formed structures which exhibit characteristic crystalline X-ray diffraction patterns and comprise a molecularly oriented copolymer of acrylonitrile and an acrylic ester having the structural formula

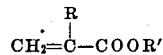

where R is a radical selected from the class consisting of hydrogen and monovalent alkyl radicals having a maximum of four carbon atoms, and R' is a radical selected from the class consisting of alkyl radicals, aralkyl radicals, aryl radicals and alkaryl radicals. Illustrative examples of radicals represented by R in the above formula are: methyl, ethyl, propyl, isopropyl, butyl, isobutyl, tert.-butyl, sec.-butyl. Preferably R is hydrogen or the methyl radical. Illustrative examples of radicals represented by R' in the above formula are: alkyl, e. g., methyl, ethyl, propyl, isopropyl, butyl, isobutyl, sec.-butyl, amyl, hexyl, decyl, etc.; cycloalkyl, e. g., cyclopentyl, cyclohexyl, methyl cyclopentyl, propyl cyclopentyl, amyl cyclopentyl, methyl cyclohexyl, dimethyl cyclohexyl, etc.; aryl, e. g., phenyl, xenyl, naphthyl, etc.; alkaryl, e. g., tolyl, xylyl, ethyl phenyl, propylphenyl, isopropyl phenyl, etc.; aralkyl, e. g., benzyl, phenethyl, phenylpropyl, phenylbutyl, etc.

Acrylonitrile and its copolymers possess outstanding properties which make them useful in the plastics art. For example, they have a desirably high softening point and are very resistant to the action of chemicals. However, although polymeric acrylonitrile and copolymers of acrylonitrile are known, as far as I am aware no one has successfully produced articles from these polymeric bodies which possessed a molecularly oriented structure. This has excluded their use in the preparation of fibers and other objects requiring a molecularly oriented structure.

I have now discovered that if acrylonitrile is copolymerized with an acrylic or alpha-substituted acrylic ester in the proportions of from 40 to 80 per cent nitrile to from 60 to 20 per cent ester and preferably from 50 to 80 per cent nitrile to from 50 to 20 per cent ester a copolymer is obtained which may be formed into the shape of filaments, foils, tubes, etc. by extrusion or precipitation methods. These shaped articles may then be cold-drawn to produce a molecularly oriented structure which exhibits the characteristic crystalline X-ray pattern. Threads made from such compositions have outstanding tensile strength of the order of 40,000–50,000 pounds per square inch. The threads are very flexible and can be tied into tight knots without breaking.

Copolymers of acrylonitrile and acrylic esters having substantially greater than 80% acrylonitrile are too hard and brittle, and have too high a melting point to be readily adaptable to the methods of forming molecularly oriented structures. Copolymers comprising substantially less than 40 per cent acrylonitrile cannot be cold drawn to produce a molecular oriented structure which exhibits the characteristic crystalline X-ray patterns. The components themselves cannot be cold drawn. Polymeric acrylonitrile is far too hard and brittle and has too high a softening point to prepare extruded or precipitated fibers or the like. Likewise the esters of acrylic acid and/or substituted acrylic acids are unsatisfactory when polymerized alone or with copolymerizable materials other than acrylonitrile, e. g., ethyl acrylate, ethyl methacrylate, styrene, ethyl acrylate-styrene, benzyl acrylate-styrene, etc. Copolymers of these and related materials cannot be cold drawn to yield articles having molecularly oriented structure. Even acrylonitrile cannot be cold drawn to give oriented products when copolymerized with such unsaturated compounds as butadiene, styrene, vinyl acetate, etc. For example, a mixture comprising

|  | Parts by weight |
|---|---|
| Acylonitrile | 70 |
| Butadiene | 30 |
| Benzoyl peroxide | 0.25 | was sealed in an autoclave and exposed to increasingly more drastic polymerizing conditions. The autoclave was first kept at room temperature for 42 hours and then at 45° C. for 7 hours. Following this the autoclave was heated to 60° C. for 72 hours and then at 80–90° C. for 48 hours. The polymer was removed from the autoclave and sheeted between the differential rolls at 100–120° C. to remove any entrapped monomers or low molecular weight polymers. Fibers made from this composition could not be cold drawn.

The preferred method for forming the oriented articles of this invention involves first the copolymerization of the selected monomers. Two satisfactory methods of polymerization may be used. An emulsion method may be carried out by placing the mixture of monomers in water containing a small amount of an emulsifying agent, e. g., polyvinyl alcohol, polymethacrylic acid, starch acetate, Aerosol, Tergitol, etc., and a polymerization catalyst. The mixture of monomers may be emulsified in the water prior to or after an initial polymerization has been effected. By rapid agitation under the influence of heat, e. g., 70–85° C., a latex is obtained which may be coagulated by the usual methods, e. g., by addition of coagulants. Alternatively the mixture of monomers may be heated alone in the presence of an activating catalyst at temperatures substantially below the boiling point of the mass in a sealed container. As the polymerization proceeds, the temperature may be increased as the vapor pressure of the mass decreases. The copolymers are freed from any monomer or low molecular weight substances by any one of several methods, e. g., by sheeting with resultant evaporation or by use of selective solvents.

The copolymers of this invention may be made into fibers, threads, filaments, films, tubes and the like by any suitable method. For example, I may extrude the copolymer under pressure through a die at elevated temperatures or I may dissolve the polymer in a suitable solvent and reprecipitate it in the desired shape by forcing the solution through a die, followed by either evaporation of the solvent or passing into a precipitant for the polymer. I prefer to use the extrusion method for shaping the articles, using temperatures ranging from 150–250° C., depending upon the particular type of polymer being used, since each polymer has a different softening point. Generally speaking the polymer is heated to some temperature above the softening point, e. g., 15–25° C. above, extruded and rapidly cooled. After the article is formed it is cold drawn, during which process molecular orientation along the major surface takes place. The extruded or precipitated articles are not in themselves molecularly oriented. It is only after the cold drawing process that they exhibit the characteristic X-ray patterns indicative of the crystalline orientation. The increase in tensile strength and flexibility after the cold drawing process is remarkable.

Any activating (polymerization) catalyst may be used in making the copolymers. For example, I may use ozone, ozonides, inorganic super-oxides such as barium peroxide, sodium peroxide, etc., aliphatic acyl peroxides, e. g., acetyl peroxide, lauryl peroxide, stearyl peroxide, tertiary butyl peroxide, etc., peroxides of the aromatic acid series, e. g., benzoyl peroxide, acetyl benzoyl peroxide, various per compounds, e. g., perborates, persulfates, perchlorates, etc., aluminum salts such as the halides, e. g., aluminum chloride, organic and inorganic acids such as methacrylic acid, hydrofluoric acid, etc., metal compounds of the unsaturated acids as, for instance, cobalt and manganese resinates, linoleates, maleates, etc. Benzoyl peroxide is a preferred catalyst in mass polymerizations and hydrogen peroxide or benzoyl peroxide in emulsion polymerizations. Any amount of catalyst may be used, but, in general, for economic reasons the catalyst concentration will be within the range of 0.1 to 2.0 per cent by weight of the whole.

In order that those skilled in the art may better understand the means by which this invention may be carried into effect the following examples are given. All parts are by weight.

Example 1

| | Parts by weight |
|---|---|
| Acrylonitrile | 40 |
| Ethyl acrylate | 60 |
| Water | 500 |
| Polymethacrylic acid | 2.5 |
| Hydrogen peroxide (30% aq. sol'n) | 1.7 |

The above ingredients were mixed together in a three-neck one-liter flask equipped with a stirrer and a reflux condenser. The reaction mixture was heated initially at 60–70° C. for a period of 1 hour and following this at 70–80° C. for 40 hours. The resulting product was a latex-type material. The copolymer was coagulated from this latex by application of heat and the addition of sodium chloride. The removal of the chloride ion from the polymer was then effected by continually washing with warm water and then with cold water. The product was now dried and any remaining easily vaporizable monomers or low molecular weight polymers were removed by sheeting on differential rolls at 150° C. The yield of product was 91%. This composition, now in a state ready for fiber formation, was premolded into a pill, dimensioned to fit snugly into the heating chamber of the extrusion apparatus. By making this preform, the presence of any air entrapped in the fibers would be virtually impossible. The preform was heated in the heating chamber to 140–165° C. and a piston pressure of 800–1200 pounds per square inch used to extrude the molten copolymer through the orifice. The extruded filament was virtually colorless, semi-opaque, and slightly elastic. The filament was maintained under slight tension during the extrusion process and was cooled quickly by a stream of cold air directed at the exterior of the orifice. The extruded filament possessed a diameter of approximately 0.012". When cold drawn at room temperature to 100–200% elongation, a fiber exhibiting crystalline orientation along the main fiber axis and possessing considerable strength and excellent flexibility was obtained. The molecular orientation of the fiber structure was evidenced by the typical crystalline X-ray diffraction pattern obtained. Further indication of an oriented structure was manifested by the conversion of the semi-opaque filament to an opaque one during the cold drawing operation.

Example 2

Using the method of preparation described in Example 1 a copolymer prepared from 50 parts acrylonitrile and 50 parts ethyl acrylate was produced in a 98% yield.

The copolymer was now extruded in the same manner as described in the preceding example or fed directly to a filament extruding machine. However, the temperature and pressure conditions used in this example were those of 150–190° C. and 1000–1500 pounds per square inch. The filament was subjected to a tension sufficient to elongate it 100–150% at room temperature. The oriented fiber was tough and sufficiently flexible so that it could be tied into tight knots. The diameter was approximately 0.012". This cold drawing operation as in the previous example effected a molecular orientation along the main fiber axis as indicated by the typical crystalline X-ray diffraction patterns obtained from fibers. The cold drawn filament possessed a tensile strength of 40,000 pounds per square inch based on the original diameter. Filaments of this composition possessed excellent resistance to many solvents, namely aliphatic hydrocarbons, alcohols, ethers, mixtures of aliphatic and aromatic hydrocarbons, etc.

Example 3

A fiber-forming composition was prepared in the same manner as in Example 1 with the exception that 60 parts acrylonitrile and 40 parts of ethyl acrylate were used. The copolymer was prepared for extrusion in the usual manner. The yield of polymer in this case was 85%.

Extrusion was carried out at 170–220° C. in the same apparatus used for the previous examples. The pressure used during the extrusion was 1000–2000 pounds per square inch. The extruded filament was cold drawn at 30–35° C., undergoing in the process about 150% elongation. Whereas the filament was somewhat brittle at room temperature following the extrusion, after cold drawing it was extremely flexible. The cold drawn fiber showed by X-ray photography a typical crystalline diffraction pattern, indicating orientation along the major fiber axis. Tensile strength tests on several samples of the oriented fiber gave values of 40,000–50,000 pounds per square inch.

The fibers possessed excellent resistance to a great many solvents, e. g., aliphatic hydrocarbons, ketones, alcohols, ethers, mixtures of aliphatic and aromatic hydrocarbons and to naturally occurring liquids, as petroleum and its distillation products.

Example 4

Beginning with a monomeric mixture of 70 parts acrylonitrile and 30 parts ethyl acrylate a copolymer was prepared by the method of Example 1. This copolymer was sheeted to rid the fiber-forming material of low molecular weight polymers and monomers. The product was now prepared for extrusion. The temperature required for satisfactory extrusion was 190–230° C. and the pressure from 1500–2500 pounds per square inch. The filaments following extrusion were pale yellow and somewhat brittle. It was not possible to tie knots with these fibers without breaking them. After cold drawing to 100% elongation, the fibers were much improved with regard to flexibility and strength. The cold drawing was carried out at 40–50° C. Tensile strength tests gave values of from 40,000–50,000 pounds per square inch. The solvent resistance of these fibers was even better than those of the previous examples. Cloth woven from these fibers may be used in contact with petroleum, gasoline. kerosene, alcohols, esters, ethers, etc. As in the previous cases the cold drawn filaments showed marked molecular orientation along the major fiber axis.

Example 5

| | Parts by weight |
|---|---|
| Acrylonitrile | 50 |
| Ethyl methacrylate | 50 |
| Benzoyl peroxide | 0.05 |

The above ingredients were mixed in a three-neck one-liter flask equipped with a stirrer and a reflux condenser. These reactants were heated 1¾ hours at 70–82° C. This temperature was obtained by gradually raising the temperature and noticing the increase in viscosity. The partially polymerized mass which was of the consistency of a heavy sirup was rapidly agitated by stirring. Five hundred parts water containing 2 parts by weight of polyvinyl alcohol were added. The partially polymerized mass was thus dispersed into bead form throughout the water. Heating was continued at 80–85° C. for 55 hours. The product of small copolymer beads was filtered, washed well with warm water and dried at 80° C. for several hours. The yield of product was 85 parts. The copolymer was sheeted on the differential rolls for 5 minutes at 150° C.

The extrusion of the preformed fiber-forming material was done at 140–180° C., employing a piston pressure of 1000 pounds per square inch. These fibers were practically colorless and of uniform cross-section. Cold drawing to produce an elongation of about 100% produced a filament that showed by X-ray photographs that a crystalline orientation along the major fiber axis had taken place. The filaments produced by this cold drawing process could be drawn into tight knots without breaking. They exhibited good strength.

Example 6

The preparation of a copolymer from a monomeric mixture of 60 parts of acrylonitrile and 40 parts ethyl methacrylate was carried out in the same manner as described in Example 5. Similarly the copolymer was prepared for extrusion and then forced through an orifice to form the fiber. The temperature required by this composition was 150–200° C. The filaments produced could be cold drawn into oriented fibers. These possessed good flexibility and a tensile strength of about 40,000 pounds per square inch. The filaments displayed excellent resistance to such solvents as aliphatic hydrocarbons, alcohols, ethers, Cellosolve, and to a limited extent to dioxane and acetone.

Example 7

The preparation of fibers from a copolymer obtained from a monomeric mixture of 80 parts acrylonitrile and 20 parts ethyl methacrylate followed the same procedure as described in Example 5. The temperature required for extrusion was 180–220° C. and the pressure required was 1000–1500 pounds per square inch. The extruded filaments were brittle and lacked good strength qualities. However, when cold drawn, thus causing an orientation parallel to the major fiber axis, the filaments exhibited excellent flexibility and a tensile strength between 40,000–50,000 pounds per square inch. The resistance of these products to hydrocarbons, alcohol, ether, ketone, naturally occurring oils and chlorinated solvents was excellent.

Example 8

A copolymer of 70 parts acrylonitrile and 30 parts benzyl acrylate was produced by mass polymerization, using 0.15 part by weight of benzoyl peroxide as an activating catalyst. Copolymerization was accomplished by heating the mixture at 65–80° C. over a period of 72 hours in a sealed container. The copolymer was sheeted on the differential rolls at 150° C. to remove any volatile components.

Extrusion through an orifice of 0.012" diameter of a preformed pellet was carried out at 160–190° C. and 1000 pounds per square inch pressure. The extruded fiber was cold drawn to cause the molecular orientation parallel to the major fiber axis. The product had good flexibility and a tensile strength of the order of 40,000 pounds per square inch.

In producing the molecularly oriented fibers of this invention I may use in addition to the ethyl acrylate, ethyl methacrylate and benzyl acrylate, such copolymerizable materials as any ester of acrylic acid, e. g., methyl acrylate, propyl acrylate, isopropyl acrylate, butyl acrylate, isobutyl acrylate, amyl acrylate, octyl acrylate, decyl acrylate, cyclopentyl acrylate, cyclohexyl acrylate, phenyl acrylate, fluorophenyl acrylate, tolyl acrylate, xylyl acrylate, chloroethyl acrylate, etc.; esters of methacrylic acid, e. g., methyl methacrylate, ethyl methacrylate, propyl methacrylate, butyl methacrylate, isobutyl methacrylate, cyclohexyl methacrylate, cyclopentyl methacrylate, benzyl methacrylate, phenyl methacrylate, iodophenyl methacrylate, tolyl methacrylate, phenethyl methacrylate, xenyl methacrylate, etc.; esters of ethacrylic acids, e. g., methyl ethacrylate, ethyl ethacrylate, propyl ethacrylate, bromopropyl ethacrylate, benzyl ethacrylate, phenyl ethacrylate, tolyl ethacrylate, etc.; esters of propacrylic acid, e. g., methyl propacrylate, ethyl propacrylate, propyl propacrylate, benzyl propacrylate, phenyl propacrylate, etc.; esters of butacrylic acid, e. g., methyl butacrylate, benzyl butacrylate, phenyl butacrylate, iodophenyl butacrylate, etc.; and other esters of acrylic acid and substituted acrylic acids in which R and R' may have the meaning previously defined. Although copolymers of any of the above or related compounds may be used in preparing the oriented fibers of this invention, nevertheless I do not mean to limit these preparations to copolymers containing only two constituents, e. g., acrylonitrile and ethyl acrylate. That portion of the copolymer other than the acrylonitrile may be one or any plurality of esters of acrylic or substituted acrylic acids. Thus I may use a copolymer of acrylonitrile, methyl acrylate and methyl methacrylate; acrylonitrile, ethyl acrylate and methyl methacrylate, acrylonitrile, benzyl acrylate and propyl acrylate; acrylonitrile, ethyl acrylate, methyl methacrylate, benzyl acrylate and isobutyl ethacrylate, etc.

For example, I may also use a multicomponent system of the following types:

Example 9

| | Parts by weight |
|---|---|
| Acrylonitrile | X (50–80) |
| Ethyl acrylate | Y (45–5) |
| Ethyl methacrylate | 100—(X+Y) |

The above ingredients are polymerized in the usual manner. Extrusion of the fiber-forming material and subsequent cold drawing results in a molecularly oriented fiber possessing good strength and flexibility. A specific composition which may be used to yield excellent results is: acrylonitrile—70 parts, ethyl acrylate—25 parts, and ethyl methacrylate—5 parts.

Example 10

| | Parts by weight |
|---|---|
| Acrylonitrile | X (50–80) |
| Ethyl acrylate | Y (45–5) |
| A third component | 100—(X+Y) |

The third component may be methyl acrylate, propyl acrylate or butyl acrylate. As in the previous example the mixture of monomers is polymerized in the usual manner and then extruded or precipitated into a form which may be cold drawn. Molecular orientation parallel to the major surface is accomplished by cold drawing.

Instead of extruding the above compositions in the shape of a thread or filament, I may extrude them in the shape of tubes, rods, or sheets which similarly can be cold drawn to yield molecularly oriented objects which exhibit characteristic crystalline X-ray diffraction patterns.

The fibers and similar articles produced according to this invention may be woven into highly insoluble and chemical resistant cloth for use as filter cloths in handling chemicals and the like. They may also be used for textiles, e. g., cloth, hosiery, etc. Textile materials made from the herein described fibers, filaments or threads are superior to silk, cotton, linen, wool, rayon or synthetic condensation polymers from the standpoint of their resistance to water, chemicals, solvents or combination thereof. They are also lighter in weight and considerably tougher and more flexible than the recently developed glass fabrics.

What I claim as new and desire to secure by Letters Patent of the United States is:

1. A molecularly oriented fiber showing a characteristic crystalline X-ray diffraction pattern which comprises a cold-drawn copolymer of (1) acrylonitrile, (2) ethyl acrylate and (3) ethyl methacrylate, the acrylonitrile being present in the proportion of 40% to 80% and the ethyl esters of the acrylic acids being present in total proportion of 20% to 60%, the sum of (1), (2), and (3) in said copolymer being equal to 100%.

2. A molecularly oriented fiber showing a characteristic crystalline X-ray diffraction pattern which comprises the cold-drawn copolymer of 70% acrylonitrile, 25% ethyl acrylate and 5% ethyl methacrylate.

GAETANO F. D'ALELIO.